(12) United States Patent
Chen et al.

(10) Patent No.: US 7,502,785 B2
(45) Date of Patent: Mar. 10, 2009

(54) EXTRACTING SEMANTIC ATTRIBUTES

(75) Inventors: Zheng Chen, Beijing (CN); Lei Li, Shanghai (CN); Chenxi Lin, Beijing (CN); Qiaoling Liu, Shanghai (CN); Jian Wang, Beijing (CN); Benyu Zhang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 143 days.

(21) Appl. No.: 11/392,761

(22) Filed: Mar. 30, 2006

(65) Prior Publication Data

US 2007/0239697 A1    Oct. 11, 2007

(51) Int. Cl.
*G06F 17/30* (2006.01)
(52) U.S. Cl. .......................................... 707/3; 707/200
(58) Field of Classification Search ................ 707/1–10, 707/100, 101, 200, 201, 203, 205; 709/201, 709/203; 715/200, 229, 733, 724
See application file for complete search history.

(56) References Cited

U.S. PATENT DOCUMENTS 6,973,466 B2 * 12/2005 Kaler et al. ................. 707/203
2004/0133544 A1 * 7/2004 Kiessig et al. ................. 707/1
2005/0076031 A1 * 4/2005 Xu et al. ......................... 707/9
2006/0112083 A1 * 5/2006 Takase et al. ................. 707/3
2006/0265428 A1 * 11/2006 Chai et al. .................. 707/200

* cited by examiner

*Primary Examiner*—Mohammad Ali
*Assistant Examiner*—Marc R Filipczyk
(74) *Attorney, Agent, or Firm*—Perkins Coie LLP

(57) ABSTRACT

Extraction of semantic information and the generation of semantic attributes allows for improved organization and management of data. Semantic attributes are automatically generated and eliminate the need for manual entry of attribute information. A semantic file network may further be constructed based on similarities between files that are based on the semantic attribute information. Semantic links representing a semantic relationship may be built between similar or relevant files. In addition, user operations and user operation patterns may also be considered in building the file network. Semantic attributes and information may further facilitate browsing the file systems as well as improve the accuracy and speed of queries.

12 Claims, 15 Drawing Sheets

| JOHN SMITH | | | |
|---|---|---|---|
| | FORWARD | REPLY | DELETE |

TO: John Smith

FROM: Jane Smith —305

ATTACHMENTS: essayone.doc; drawingone.drw —310

SUBJECT: Please proofread and review

Dear John:

I have written the attached essay about ⸢lions⸣ —320 The attached drawing corresponds to the essay and is a illustration of a ⸢lion⸣ in his natural habitat. Our instructions were to write an essay on our favorite animal and thus, I chose to write about ⸢lions⸣. Please review my essay and let me know how it looks. I may also bring in a stuffed ⸢lion⸣ toy for my oral presentation. Thanks!

Sincerely,

Jane

EXTRACTING SEMANTIC ATTRIBUTES

BACKGROUND

Electronic file and data storage systems allow a user to save, organize and manage a substantial amount of information within a single computing device. Thus, rather than carrying the actual documents, a user may simply access a computing device such as a laptop computer. These storage systems further provide organizational systems whereby files may be arranged by the user in a meaningful way. For example, all documents relating to a planned vacation may be saved into the same folder or various subdirectories thereof. Basic attributes of the files and other data structures are also embedded in such storage systems to permit users to locate or organize data by searching for a particular attribute and/or property. Data and files may also be sorted and organized according to these properties. These attributes and properties are typically predefined by the system and are often labeled or entered by the user.

However, current file systems ultimately limit a user's ability to search and locate files since they provide only basic properties and attributes. Additionally, users must often modify attributes and properties manually to maintain proper organization in the system. Further, the organization and management of file systems remain constant regardless of a user's manipulations or interactions with a particular file. Additionally, directories of files and other organizational structures are strictly location oriented rather than usage oriented.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In particular, file systems and networks are unable to capitalize on implicit information and inferences that may be determined or drawn from user interactions and contextual information. Implicit information, as used herein, relates to relationships and attribute information that is derived based on an interpretation of user actions or data associated with a particular file. Aspects are thus directed to a method and system for extracting semantic information from contextual information and user operations relating to a specified file and generating semantic attributes for the specified file based on such information. Semantic attributes may include information such as a publication year for a document, a conference at which a slideshow was shown and an artist that performs a particular song. Contextual information may be determined from data surrounding or otherwise associated with the specified file. Accordingly, context information and semantic attributes may be determined from a text message of an e-mail to which a file is attached. For example, if an e-mail message is determined to relate to a particular piece of real estate property, a semantic attribute may be generated for a file attached to the e-mail, identifying a relationship between the file and the specified real estate property.

Semantic information and attributes may also be extracted based on user operations and a sequence thereof. Oftentimes, user operations have an inherent meaning or purpose that may allow a system or application to interpret one or more aspects of a file associated with the user operations. For example, a user may frequently access two files simultaneously. Based on this behavior or operation pattern, a semantic attribute may be generated associating the two files (e.g., referencing one file to the other). Semantic attributes may further be generated based on a combination of context information and user operation history as well as other sources of file information.

In another aspect, semantic attributes may be automatically updated in response to detecting a change or modification in the context information or operation history associated with that particular attribute. In one instance, a semantic attribute generated for a file embedded in a word processing document may be updated if the underlying document is modified. The update to the semantic attribute may reflect the modification in context of the document or the user interaction involved in modifying the document or both.

In another aspect, the semantic attributes may be used to build a semantic file network in which files may be linked to one another based on identical or similar attributes. Relevance and similarity between files and attributes may be determined based on a similarity calculation. The similarity calculation may take into account various information including the attributes and data associated with neighboring or associated files or data. The semantic file network may further link one file to another if a user's operations support such an inference. The links between files may be static or dynamic. In other words, once a link is created, the link may continue to exist until explicitly destroyed by the user or some other process. On the other hand, dynamic links may be modified in response to a particular event such as a user modifying the attributes of a file or the links may be modified according to a predefined schedule. The semantic file network may be built with a combination of dynamic and static links that apply to different parts of the file network.

According to yet another aspect, browsing the semantic file network may be enhanced by the semantic links between files. That is, browsing clues such as related files or other data may be provided to the user based on the semantic links as a user browses or navigates through files. For example, if a user access a file or highlights a file in a folder, a list of semantically related or linked files may be presented to the user. Users may further post queries to retrieve files based on semantic attributes and information and associated semantic links. In one example, a user may post a query based on a collection of files. The file attributes of the collection of files may be automatically combined to produce a query of semantic information. A query may also be run based on a combination of semantic information and non-semantic information.

BRIEF DESCRIPTION OF THE DRAWINGS

The present disclosure is illustrated by way of example and not by limitation in the accompanying figures in which like reference numerals indicate similar elements and in which:

FIG. 3 is a user interface displaying an electronic mail message with attachments according to one or more aspects described herein.

DETAILED DESCRIPTION

In the following description, reference is made to the accompanying drawings, which form a part hereof, and in which is shown by way of illustration various embodiments. It is to be understood that other embodiments may be utilized and structural and functional modifications may be made without departing from the scope of the present disclosure.

Figure 1:
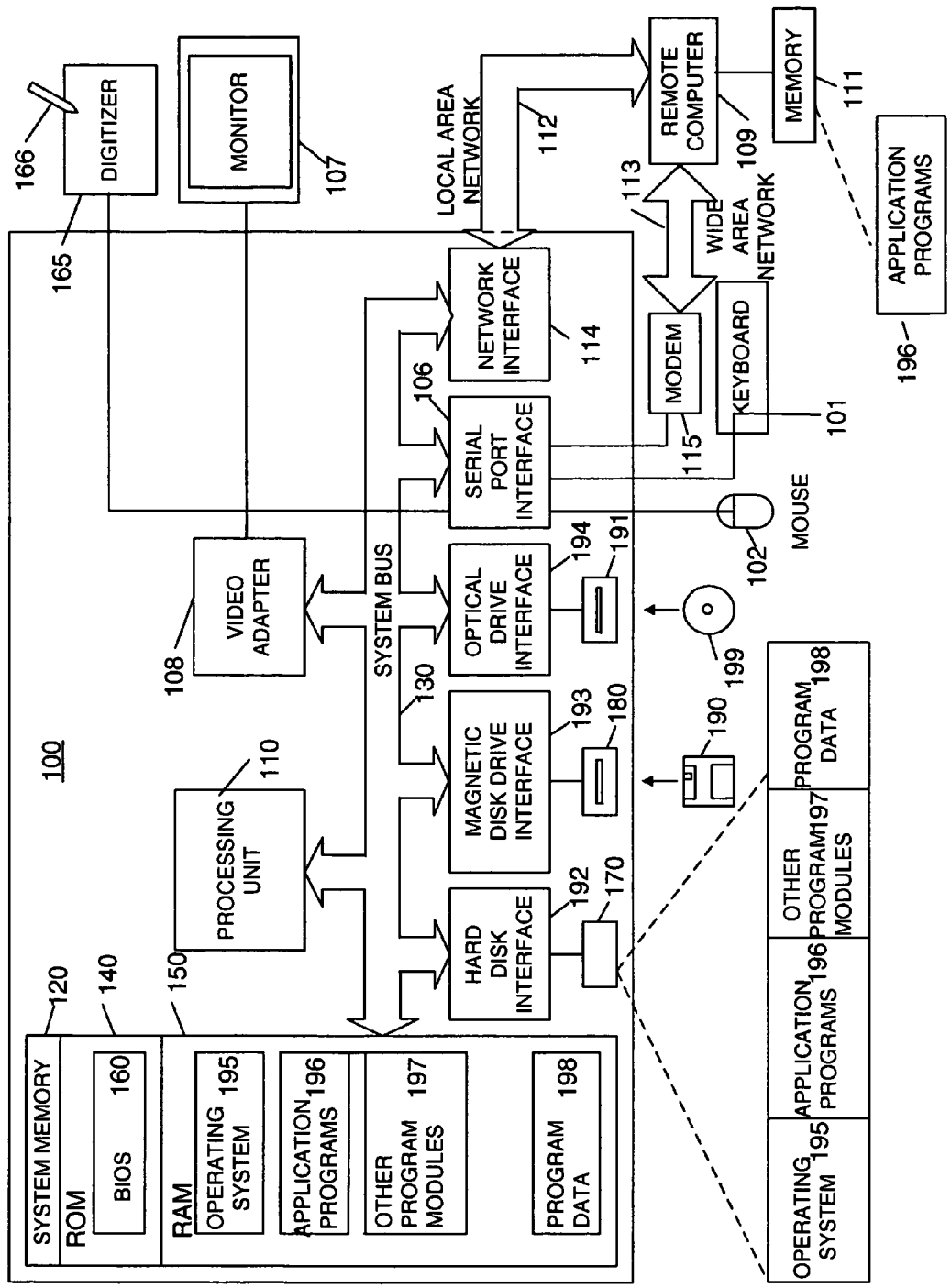
FIG. 1 illustrates a block diagram of a general-purpose digital computing environment that can be used to implement various aspects of the present disclosure.

FIG. 1 illustrates a schematic diagram of a general-purpose digital computing environment. In FIG. 1, a computer 100 includes a processing unit 110, a system memory 120, and a system bus 130 that couples various system components including the system memory 120 to the processing unit 110. The system bus 130 may be any of several types of bus structures including a memory bus or memory controller, a peripheral bus, and a local bus using any of a variety of bus architectures. The system memory 120 may include read only memory (ROM) 140 and random access memory (RAM) 150.

A basic input/output system 160 (BIOS), which contains the basic routines that help to transfer information between elements within the computer 100, is stored in the ROM 140. The computer 100 also may include a hard disk drive 170 for reading from and writing to a hard disk (not shown), a magnetic disk drive 180 for reading from or writing to a removable magnetic disk 190, and an optical disk drive 191 for reading from or writing to a removable optical disk 199, such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. These drives and their associated computer-readable media provide nonvolatile storage of computer-readable instructions, data structures, program modules, and other data for the personal computer 100. It will be appreciated by those skilled in the art that other types of computer-readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 199, ROM 140, or RAM 150, including an operating system 195, one or more application programs 196, other program modules 197, and program data 198. A user can enter commands and information into the computer 100 through input devices, such as a keyboard 101 and pointing device 102 (such as a mouse). Other input devices (not shown) may include a microphone, joystick, game pad, satellite dish, scanner, or the like. These and other input devices often are connected to the processing unit 110 through a serial port interface 106 that is coupled to the system bus 130, but they also may be connected by other interfaces, such as a parallel port, game port, or a universal serial bus (USB), and the like. Further still, these devices may be coupled directly to the system bus 130 via an appropriate interface (not shown).

A monitor 107 or other type of display device also may be connected to the system bus 130 via an interface, such as a video adapter 108. In addition to the monitor 107, personal computers typically include other peripheral output devices (not shown), such as speakers and printers. In some example environments, a stylus digitizer 165 and accompanying stylus 166 are provided in order to digitally capture freehand input. Although a connection between the digitizer 165 and the serial port interface 106 is shown in FIG. 1, in practice, the digitizer 165 may be directly coupled to the processing unit 110, or it may be coupled to the processing unit 110 in any suitable manner, such as via a parallel port or another interface and the system bus 130 as is known in the art. Furthermore, although the digitizer 165 is shown apart from the monitor 107 in FIG. 1, the usable input area of the digitizer 165 may be co-extensive with the display area of the monitor 107. Further still, the digitizer 165 may be integrated in the monitor 107, or it may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and it typically includes many or all of the elements described above relative to the computer 100, although for simplicity, only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets, and the Internet, using both wired and wireless connections.

When used in a LAN networking environment, the computer 100 is connected to the local area network 112 through a network interface or adapter 114. When used in a WAN networking environment, the computer 100 typically includes a modem 115 or other means for establishing a communications link over the wide area network 113, such as the Internet. The modem 115, which may be internal or external to the computer 100, may be connected to the system bus 130 via the serial port interface 106. In a networked environment, program modules depicted relative to the personal computer 100, or portions thereof, may be stored in the remote memory storage device.

It will be appreciated that the network connections shown are examples, and other techniques for establishing a communications link between computers can be used. The existence of any of various well-known protocols such as TCP/IP, Ethernet, FTP, HTTP, UDP, and the like is presumed, and the computer 100 can be operated in a user-server configuration to permit a user to retrieve web pages from a web-based server. Any of various conventional web browsers can be used to display and manipulate data on web pages.

Although the FIG. 1 environment shows one example environment, it will be understood that other computing environments also may be used. For example, an environment may be used having fewer than all of the various aspects shown in FIG. 1 and described above, and these aspects may appear in various combinations and subcombinations that will be apparent to one of ordinary skill. Additional elements, devices or subsystems also may be included in or coupled to the computer 100.

Figure 2:
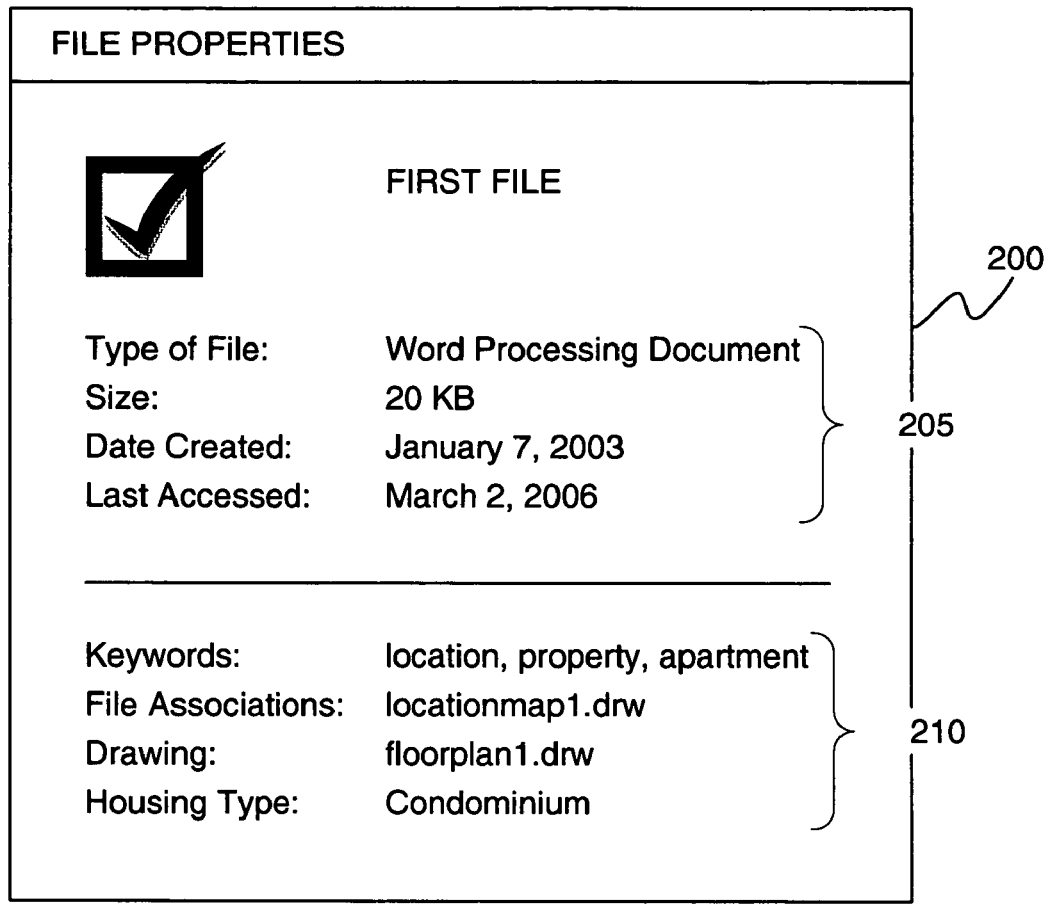
FIG. 2 is a diagram of a file properties dialog according to one or more aspects described herein.

FIG. 2 illustrates a file properties dialog window 200 having operating system and application defined properties 205 and semantic attributes 210. In one or more configurations, user dialog window 200 may be displayed on a user interface of monitor 107 (FIG. 1). System and application defined properties 205 include information such as file name, size, creation date, type of file and date of last access. Properties 205 and attributes 210 may be generated at various times including when the file is first created or received on a particular system, when the file is modified and/or when the file is accessed. The information associated with system or application properties 205 is generally automatically generated according to file types, file sizes and/or relevant applications. Some properties, such as the file name, may be either manually specified by the user or automatically generated according to a predefined naming scheme. Semantic attributes 210, as used herein, relate to properties and characteristics which are not predefined by an underlying operating system or application and that are determined based on an interpretation or meaning of associated content or data and user interactions. Attributes 210 may include a variety of information including keywords and file associations. Some attributes 210 may be related to file specific information such as a reference to a drawing and housing type attribute for files relating to real estate. Semantic attributes 210 are generated based on the meaning and/or interpretation of data or user operations associated with the particular file. Semantic attributes 210 may further be generated based on general information such as file types, relevant applications, user labeling and/or file content. In one example, one or more semantic attributes such as music genre and song title may be generated based on an evaluation of song lyrics contained within a music file. Similarly, semantic attributes related to a song title, composer and artist may be extracted from a lyric file associated with a particular song. In another example, a user may label a digital photograph with names of people captured in the photo. Accordingly, a semantic attribute indicative of a number of people in the photo may be extracted and generated for the photo file based on the names of the people captured. Semantic attributes of a file may be stored in a variety of ways including as meta-data in a meta-data file associated with the file. The meta-data file may be stored in the same location as the file or may be stored in a designated location. Additionally or alternatively, semantic attributes may be stored in a central database and indexed according to the identity of the associated file. As such, when accessing a particular file, the associated semantic attributes may be located and retrieved from the central database.

Semantic attributes 210 may be extracted and/or generated through analyzing a context associated with the file and evaluating an operation history associated with a particular file. Context information relates to data and information surrounding a particular file or piece of content which provides meaning or interpretation to the file or content. Context information may be determined from a variety of sources including attributes or content associated with a folder in which a file is currently stored and/or an electronic mail (e-mail) message in which the file is received. As such, in one instance, an attribute identifying a document author may be determined and generated based on the contents of an e-mail message to which the document was attached. Additionally, semantic file attributes 210 may be extracted from an operation history that may include user interactions and previous file operations. User operations and interactions may be evaluated or analyzed from a temporal (historical) perspective and/or on a spatial (relational) basis. Temporal relationships relate to associations between a sequence of user interactions as they occur over a period of time. For example, a semantic file may define and generate an attribute for a file relating to a time of day that the file is most frequently used or accessed. The time of day attribute may be generated based on a historical evaluation of when a user most frequently accesses the file. Thus, if a user frequently enters time in a time worksheet in the late afternoon, a semantic attribute identifying the late afternoon as the time of most frequent use or access may be generated for the time worksheet file.

Spatial relationships, on the other hand, relate to an association between multiple files that are based on one or more user interactions between the multiple files. In one or more instances, a user may cut and paste portions of a first file into a second file thereby creating an association between the first file and the second file. As such, the association between the first and second files may be reflected in a semantic attribute. In another example, a drawing file may be added to the semantic attributes of a children's story file if the system determines that the drawing file and the story file are frequently open at the same time. One of skill in the art will appreciate that a variety of user interactions or operations may include implicit semantic relationships and information that may serve as a basis for generating semantic attributes.

FIG. 3 is a diagram illustrating an e-mail 300 and contents thereof. The e-mail, like dialog window 200 (FIG. 2), may be displayed on a display device such as monitor 107 (FIG. 1). E-mail 300 may further be received through a variety of networks including LAN 112 and WAN 113 (FIG. 1). E-mail 300 includes multiple fields and components such as recipient field 323, sender field 325, attachments 305 and 310, subject line 327 and message 315. Message 315 includes a text message that contains one or more keywords such as keyword 320. Keywords may be identified based on a frequency of use or appearance in message 315. Identification of keywords may, additionally or alternatively, be based on the appearance of the word (e.g., font size, style, color) and/or a context in which the word is used. Message 315 may also include information of various mediums including audio, video and text.

Semantic information and attributes for e-mail 300 and/or attachments 305 and 310 may be generated based on the contents of e-mail 300. For instance, the recipient field 323 may contain a plurality of recipients of e-mail 300. Semantic attributes directed to a purpose for or importance of e-mail 300 may be determined based on the list of recipients. If the recipients include high level officials of a corporation, for example, an attribute indicative of the high importance of mail 300 and attachments 305 and 310 may be extracted and generated based on the importance of the recipients. Alternatively or additionally, if mail 300 is directed to technical support staff, mail 300 may be flagged with a purpose attribute identifying mail 300 as a support request. Further, a general subject matter of message 315 may be ascertained using various semantic analysis algorithms on message 315. The determined subject matter may then be applied as attributes to mail 300 and attachments 305 and 310. Keyword 320 and subject line 327 may also provide relevant context information.

Figure 4:
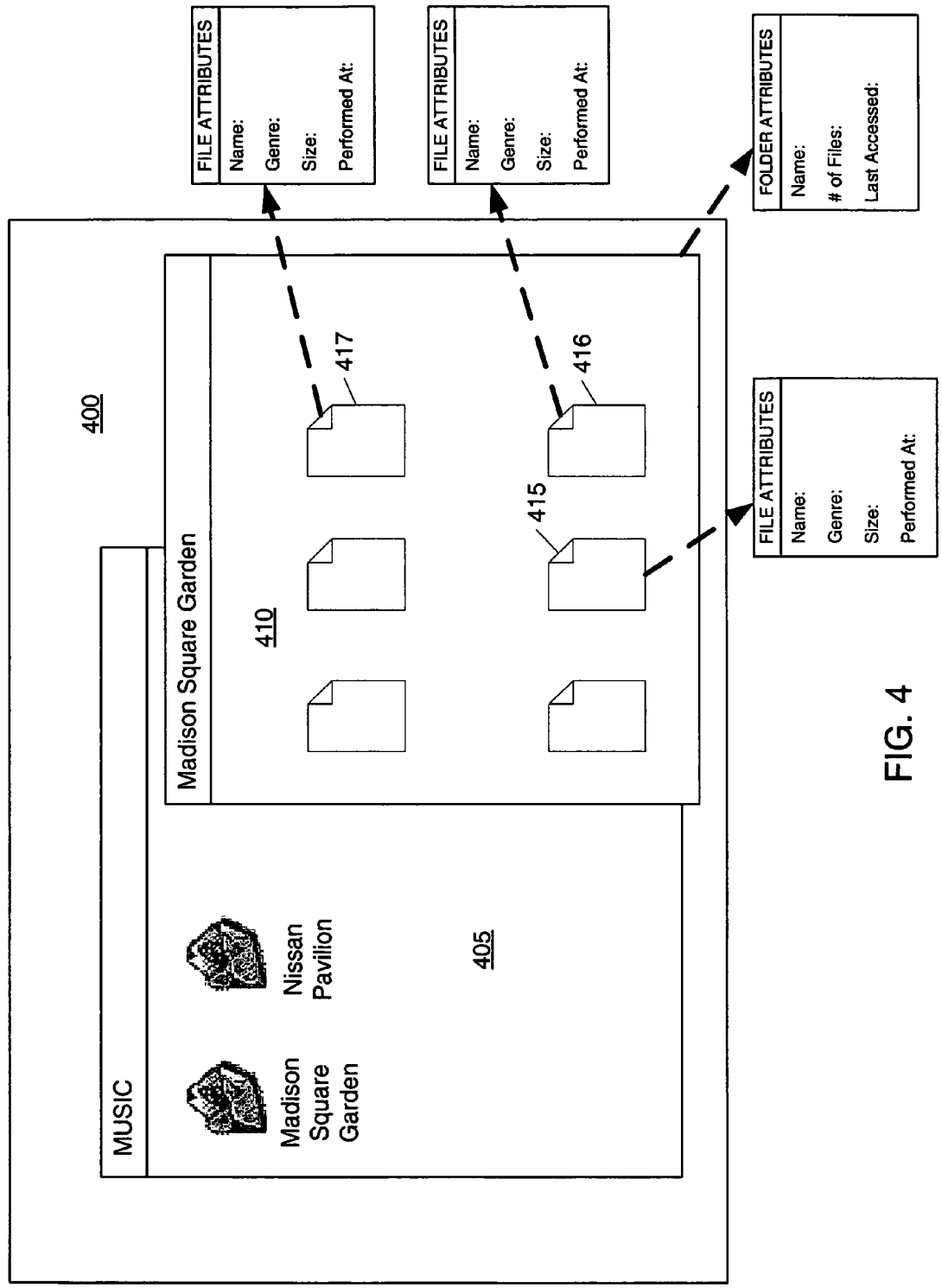
FIG. 4 is a user interface displaying multiple explorer windows corresponding to different storage locations according to one or more aspects described herein.

FIG. 4 is a diagram of a user interface displaying two file explorer windows 405 and 410 for navigating to and locating music files 415, 416 and 417 stored in a computing device such as computer 100 (FIG. 1). In many graphical user interfaces, graphical elements such as windows 405 and 410 are commonly used to graphically represent folders that are used for organizing and storing various data structures like files 415, 416 and 417. In this configuration, music files 415, 416 and 417 are organized based on the type of data. As such, music files 415, 416 and 417 are located and stored in 80's subdirectory 410, which is a subdirectory of Music folder 405. One of skill in the art will appreciate that numerous types of management schemes and methods for organizing files 415, 416 and 417 may be used. Each file 415, 416 and 417 of 80's folder 410 may further include one or more file attributes including system and application defined properties such as a name and size of the file and/or semantic attributes such as a genre of music and/or a performance location of a particular song.

The contents and characteristics of folders 405 and 410 provide context information from which semantic attributes for each of files 415, 416 and 417 may be generated. Accordingly, in one instance, the name of folder or directory 410 may contribute to the creation and definition of a semantic attribute associated with files 415, 416 and 417. For example, the name of folder 410 is "Madison Square Garden." Based on an analysis of the name, the underlying system or application may determine that Madison Square Garden is a concert venue. An inference may then be made that each of files 415, 416 and 417 stored in folder 410 was performed at Madison Square Garden. As such, a semantic attribute may be created that identified the performance location of each of files 415, 416 and 417 as Madison Square Garden. Other attributes of the folder may also be used in defining semantic attributes of files 415, 416 and 417 stored therein. For example, a folder attribute may specify a number of times folder 410 has been accessed. Specifically, the frequency of access of folder 410 may contribute to a generating a popularity attribute for files 415, 416 and 417. In one or more configurations, attributes may further be gleaned from attributes of parent directories and one or more relationships between the parent directories and subdirectories. In other words, one or more attributes of a parent directory may provide context information for interpreting data or attributes associated with a subdirectory. For example, in FIG. 4, the name of Music folder 405 provides context to the name of 80's folder 405.

Similarly, the file attributes, contents and characteristics of each file 415, 416 and 417 may also establish a context from which semantic attributes of each of the other files 415, 416 and 417 may be determined. In particular, a comparison and analysis of one or more file attributes of files 416 and 417 may define semantic attributes for file 415. For example, a comparison of the attributes associated with files 416 and 417 may reveal that both music files 416 and 417 are performed by the artist New Kids On The Block and that the lyrics of each file 416 and 417 are substantially similar. Based on the result of this comparison, an inference may be made that the artist who performs music file 415 is also the New Kids On The Block if the lyrics of file 415 are also similar to the lyrics of files 416 and 417. Accordingly, an appropriate artist attribute for file 415 may be generated based on the surrounding context information (i.e., the contents and characteristics of neighboring files 416 and 417). In another instance, a playlist position of music file 416 may be automatically established based on the playlist positions of music files 415 and 417. For instance, if files 415 and 417 are in consecutive positions in the playlist and correspond to the same artist, file 416 may also be placed in a consecutive position to either file 415 or 417 if file 416 is also determined to be performed by the same artist.

Semantic attributes may further originate from an analysis of the contents of each music file 415, 416 and 417. The contents of music file 415, 416 or 417 may include, for example, lyrics, musical scores and the like. Accordingly, in one or more configurations, a system or application may identify the instruments used in the music and automatically classify music files 415, 416 and 417 based on a determined instrumental composition. Additionally, lyrics may also be a source of context information. For example, a genre of music associated with file 415 may be ascertained based on a comparison of the lyrics of file 415 with those of file 416. Numerous other aspects of how, where and when a file is stored may also be used in establishing a context for generating one or more semantic attributes of the file.

Figure 5:
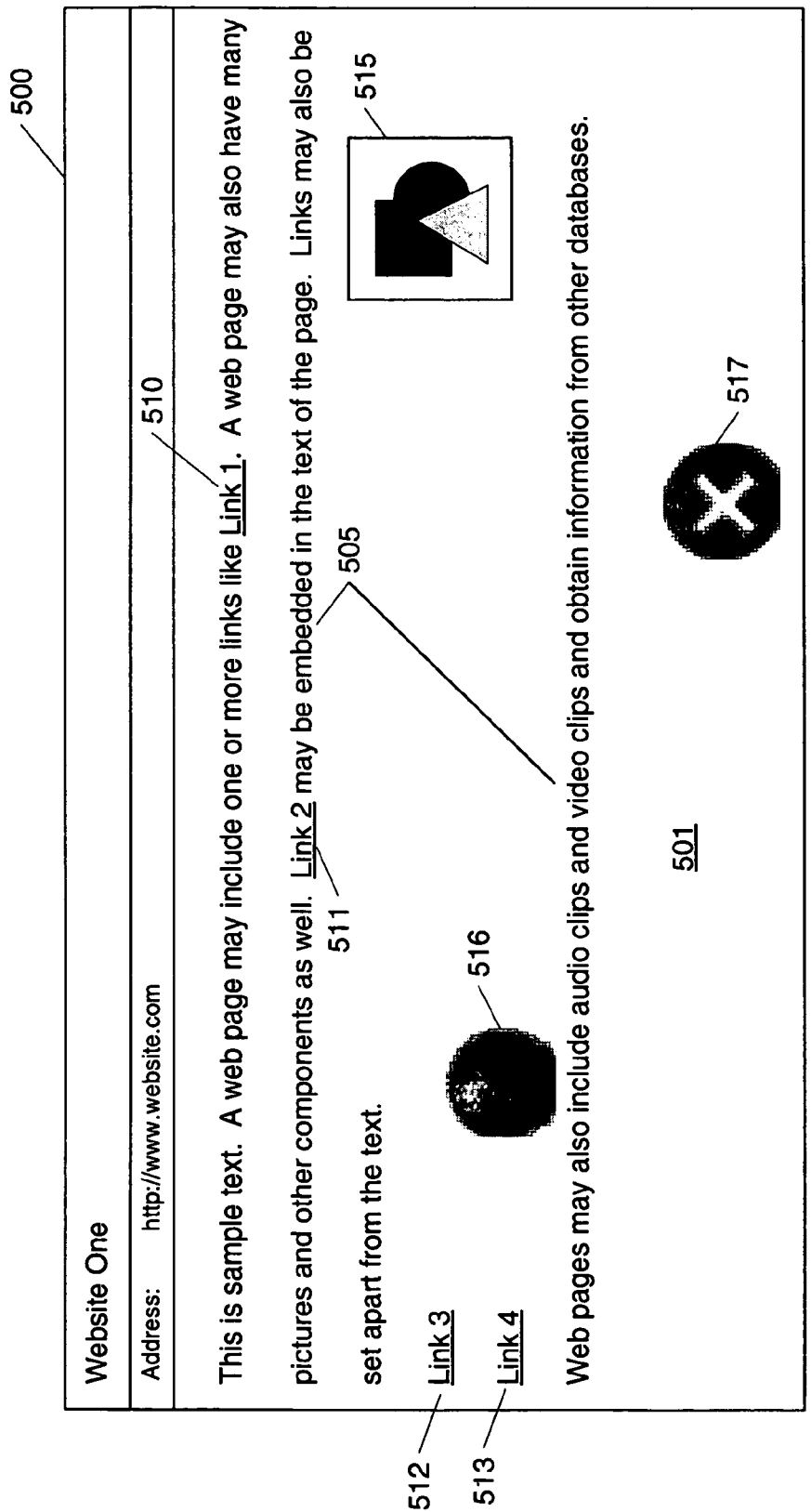
FIG. 5 is a user interface displaying a web browser and associated web page having text content, links and icons according to one or more aspects described herein.

FIG. 5 illustrates a web browser 500 displaying web page 501 with several hypertext links 510, 511, 512 and 513, icons 515, 516 and 517 and text 505. Similar to attachments in an e-mail and files in a folder or directory, the various components of page 501 may also acquire semantic attributes based on a context established by one or more associated components. For example, link 510 or 511 may be stored in a data structure of a local file system that identifies link 510 as a favorite or frequently visited link. Various attributes may be associated with the local data structure storing link 510. One or more semantic attributes may be generated for link 510, or the associated storage structure, based on attributes, content or data associated with links 511, 512 and 513, text content 505 and/or icons 515, 516 and 517. In one example, web page 501 may address a political issue and present arguments on the issue that appeal to a first political party, Democrats, and arguments that appeal to a second political party, Republicans. As such, each of links 510, 511, 512 and 513 may lead to content that is politically biased. Accordingly, a political affiliation attribute of link 510 may be determined based on the surrounding text 505 as well as icons 515, 516 and 517 and the contents and characteristics of other links 511, 512 and 513. If, for example, icon 515 depicts a donkey resembling the Democratic Party mascot, link 510 may be affiliated with the Democrats instead of the Republicans. Alternatively or additionally, an analysis of text 505 may reveal that the language used and viewpoints expressed therein are heavily Republican. Thus, using contextual information from the text analysis, the political affiliation attribute of link 510 may be identified or defined as Republican rather than Democratic. Further, the evaluation and analysis of context information may be expanded to include not just the characteristics and properties of links 511, 512 and 513, but also the contents of the pages identified by links 511, 512 and 513. Semantic attributes may be generated for each of icons 515, 516 and 517 and page 501 based on a similar contextual analysis.

In one or more configurations, semantic attributes of data such as an icon, an e-mail message or a data file may be updated in response to detecting an update to the data or context associated with the file, icon or mail message. For example, the performance location of file 415 may be modified from Madison Square Garden to the United Center in response to detecting a corresponding change in the name of folder 410. In another scenario, page 501 may relate to a toy advertisement with icon 515 depicting the toy. Initially, page 501 may provide context information that causes a semantic attribute to be created identifying icon 515 as a toy for children ages 2 and older. However, if a correction is made to page 501 to indicate that the toy is actually for children 5 and up, the age attribute of icon 515 may similarly be corrected upon detecting the change in the context information of page 501. As such, a semantic attribute may be adaptive and aware of changes to context information on which the creation of the semantic attribute was based.

Figure 6:
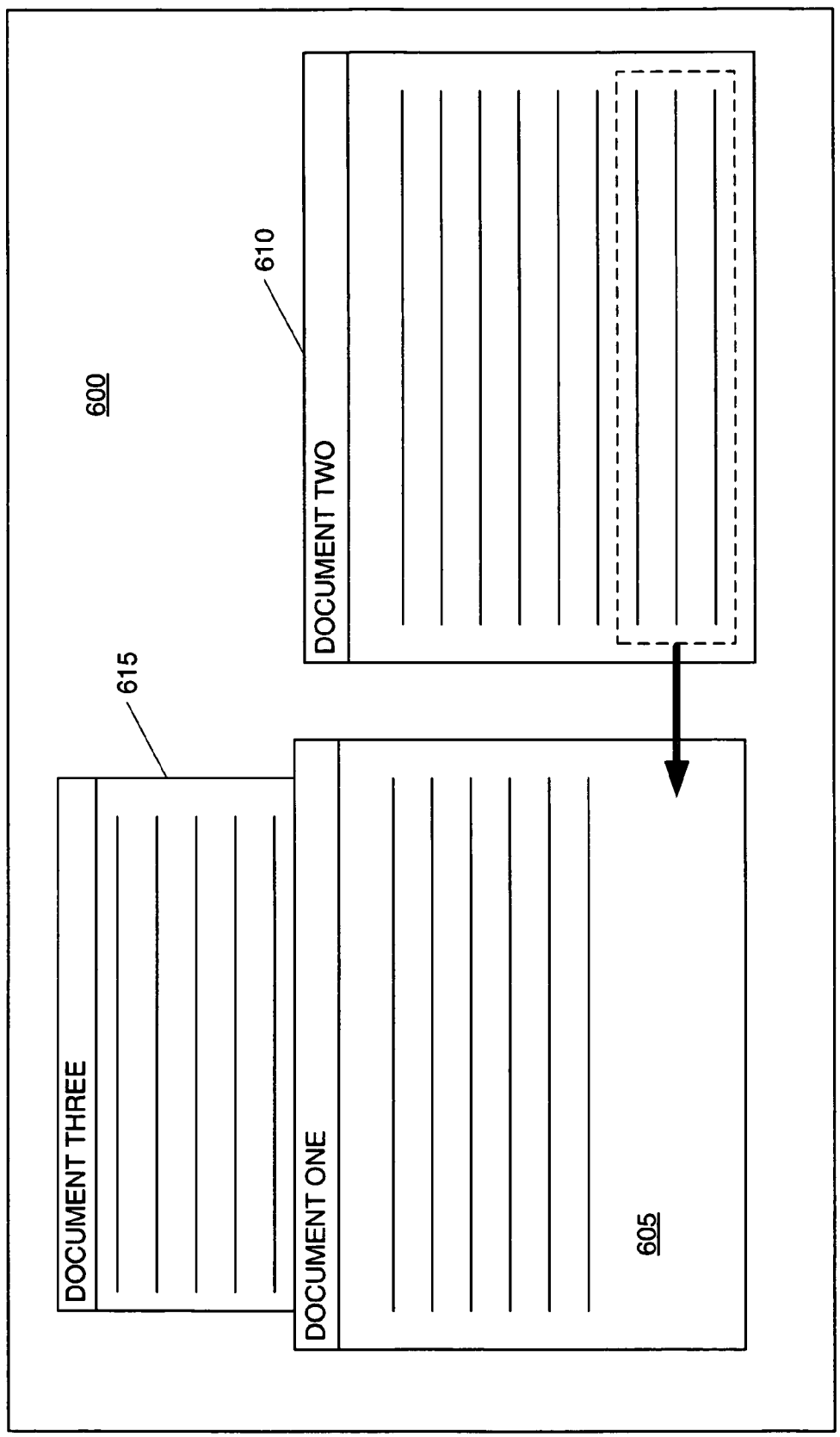
FIG. 6 is a user interface displaying three file windows and a user operation associated with the file windows according to one or more aspects described herein.

FIG. 6 illustrates a spatial relationship between two files 605 and 610 defined by at least one user operation. Underlying user interface 600 may further display a third file 615 that is open at the same time as files 605 and 610. Based on the simultaneous access of files 605, 610 and 615, a semantic attribute may be generated for file 605 that stores an association with or reference to files 610 and 615. File associations may further depend on whether files 610 and 615 are open or active on interface 600. If, for example, a user minimizes file 615 but leaves file 610 open when accessing file 605, an attribute associating file 610 with file 605 may be generated, but an attribute associating file 615 with file 605 might not. Alternatively, a relationship between files 605, 610 and 615 may be based on whether the files 605, 610 and 615 are concurrently active or open and/or the duration of the concurrent activity or use. Thus, even if file 605 is not simultaneously accessed or opened with file 610, as long as files 605 and 610 are open concurrently for a specified duration, a file relationship may still be established between the two files 605 and 610. The specified duration may be defined based on user preferences or based on a default set by an underlying semantic file system.

In one or more configurations, a semantic attribute identifying the file associations might not be created until after a user has simultaneously opened the three files a certain number of times. This threshold value may be predefined by the user or set by a default value. Other algorithms may also be incorporated in determining an appropriate frequency threshold value. A history of access times and other user operations may further be saved to files 605, 610 and 615 or, additionally or alternatively, to a separate database that is responsible for tracking user operations. The stored historical user operation data may be used, for example, in evaluating whether a semantic attribute should be generated for a given file or data structure.

One or more semantic attributes may further be extracted and generated in response to other types of user operations beyond the simultaneous access of files 605, 610 and 615. As shown in FIG. 6, a portion of file 610 is copied and pasted into file 605. The copy and paste operation may signify to the system or underlying application that the relationship between files 605 and 610 is significant. As such, the user operation increases the likelihood that a semantic attribute associating files 605 and 610 may be generated. Semantic attributes generated based on spatial relationships of user operations are not limited to file associations and may include other types of inferences. In one example, portions of multiple files may be copied and pasted into file 605. Upon detecting the multiple copy and paste operations associated with file 605, a semantic attribute may be generated for file 605 that identifies file 605 as a compilation document. Numerous additional semantic attributes may be extracted and generated from a vast array of spatial relationships between files or other data structures.

Figure 7:
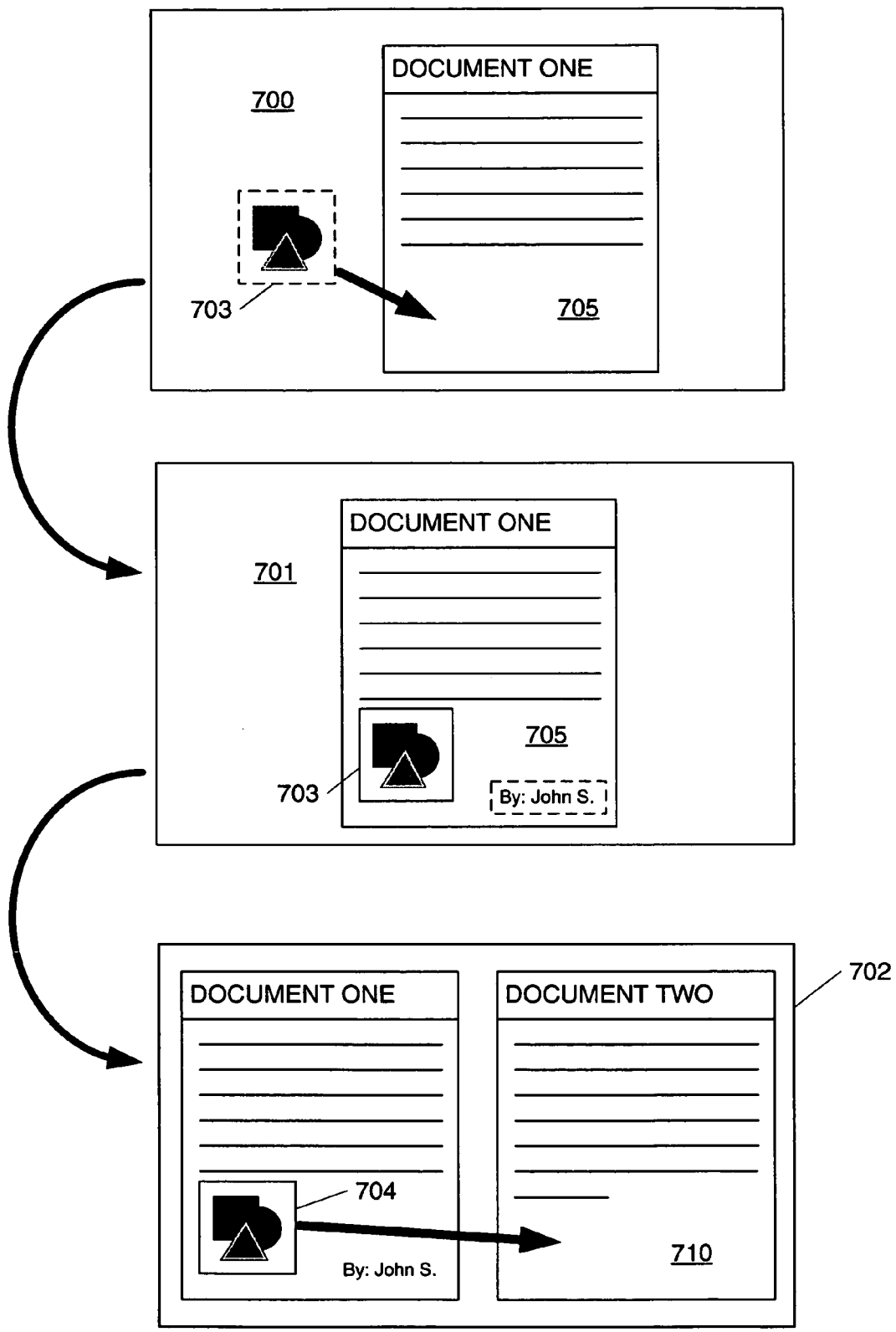
FIG. 7 illustrates a series of user interfaces displaying a sequence of user operations according to one or more aspects described herein.

FIG. 7 depicts a series of user interface screens 700, 701 and 702 that illustrate a sequence of user operations associated with files 703, 705 and 710 from which one or more semantic attributes are extracted. Initially, picture 703 is copied and pasted into word processing document 705 in screen 700. The original file containing picture 703 is then closed in interface 701 at the same time a user enters author information 707 into document 705. Subsequently, a second document such as document 710 is opened simultaneously with document 705 and picture 703 is copied from document 705 to document 710. An operating system or application may analyze this series of user operations to determine relevant semantic information. In particular, a semantic attribute identifying the author of document 710 may be extracted from the sequence of user operations including the initial copying and pasting of picture 703, the entry of author information into document 705 and the copying of picture 703 from document 705 to document 710. More specifically, the semantic attribute system may establish a correlation between picture 703 and author information 707 entered by the user in interface 701 based on the sequence of user operations. Accordingly, a semantic attribute may be generated for subsequent documents to which picture 703 is attached or pasted identifying the author of the document in accordance with author information 707.

Additionally or alternatively, semantic information and attributes may be extracted from a combination of context information, user operations and other associated information and actions. Thus, even if the copying of picture 703 and corresponding entry of author information 707 in document 705 has only occurred once, context information may increase the likelihood that a correlation is established between picture 703 and author data 707. For example, an analysis of the contents of documents 705 and 710 may reveal substantially similar content. Thus, the result of the comparison may provide a proper context for establishing the correlation between picture 703 and author information 707. Other types of information from which semantic information may be extracted or determined include user labels, file type, associated applications and file content.

Figure 8:
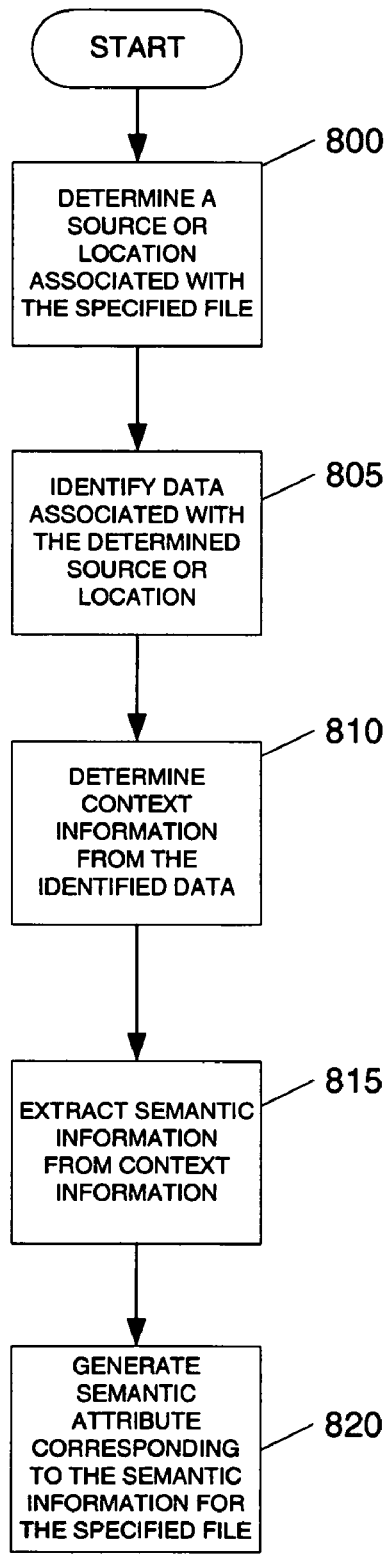
FIG. 8 is a flowchart illustrating a method for determining context information and extracting semantic attributes based on the context information according to one or more aspects described herein.

FIG. 8 is a flow chart showing a method for extracting a semantic attribute based on context information of a source or location of a file. In step 800, a source or location of a specified file is initially determined. The source may include an e-mail to which the file is attached or a document in which the file is embedded. A location may include a directory or folder in which the file is stored, a network device, a database or any one of a number of storage structures. Once the source or location has been determined, data associated with the source or location is identified in step 805. The data may include additional files stored within the source or location, attributes and other properties and/or content such as a text message of an e-mail. The data may further include audio, video and/or text. In step 810, a context associated with the identified data is determined. The context may be determined in a variety of ways including comparing content between the identified data and/or between the content of the file and the identified data. In addition, context information may also be determined based on attributes or characteristics of the identified data and a comparison thereof. For example, a similarity or relevance between files may be determined by comparing the similarity of the attributes or characteristics. The determination of similarity and relevance is discussed in further detail below. Attributes and properties may include author information, creation time, access time, file size, file type, application associations and the like. Language, audio and image analysis may also be used to evaluate text content in the identified data and determine an interpretation or meaning of the identified data. For example, images may be determined to be similar based on an analysis of color distribution.

Using the determined context information, semantic information may be extracted or determined in step 815. For example, if a folder in which the file is stored is named "WWW2005," an inference may be drawn that relates the file to a WWW2005 conference. A semantic attribute may subsequently be generated for the file that identifies the relationship and/or inference in step 820. The semantic attribute may be generated in a separate database or table associated with an underlying semantic file system or the attribute may be stored within the associated file. For example, the file may contain a header that stored all property and attribute information. Thus, based on the inference of the above example, a semantic attribute such as "Conference" with an associated value of WWW2005 may be generated for the file. Similarly, if a comparison between the file and at least a portion of the identified data results in a substantial similarity, a semantic attribute may be created for the file that references the relevant portion of the identified data. Examples of other types of information that may be inferred from context information include music genre, author/artist information, a general subject matter and the like.

Figure 9:
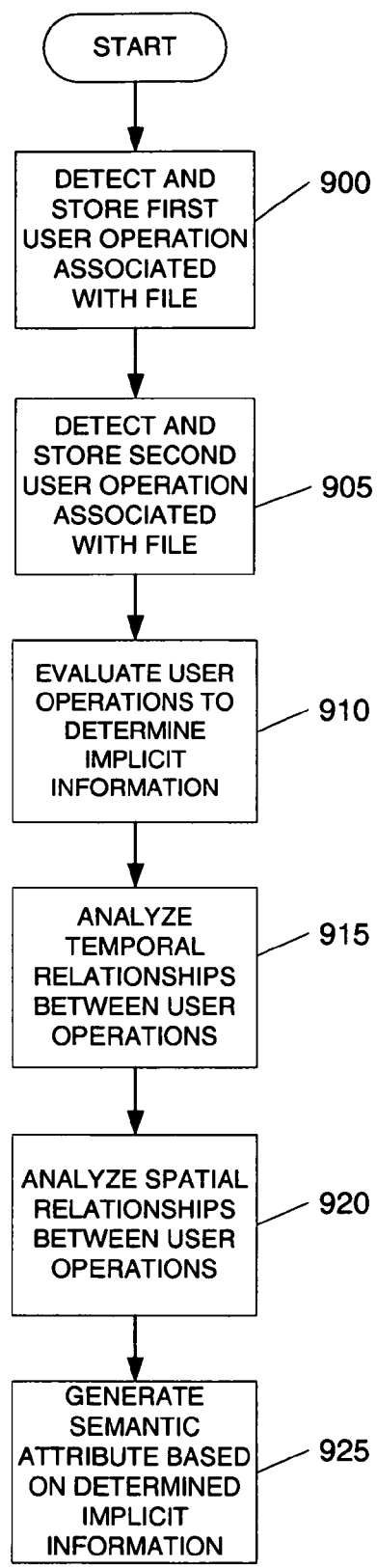
FIG. 9 is a flowchart illustrating a method for determining semantic attributes based on one or more user operations according to one or more aspects described herein.

FIG. 9 is a flowchart illustrating a method for determining semantic attributes from user operations. In step 900, a first user operation associated with a file is detected and stored. In step 905, a second user operation associated with a file is received and also stored. Depending on a variety of factors including user preferences, the user operations may be stored in a temporary buffer and/or a permanent database of user interactions. For example, the temporary buffer may store user operations that occurred within the past hour. Alternatively, a permanent database may be used to eliminate temporal restrictions in storing user operations. Upon receiving and storing the two user operations, each user operation may be individually evaluated to identify implicit information in step 910. Inferences may be also drawn from the user operations based on a temporal relationship between the operations or files involved in the operations and/or a spatial relationship between the operations or files. Thus, in steps 915 and 920, the user operations may be analyzed both temporally and spatially to extract any implicit or semantic relationships associated with the user operations. For example, an implied relationship between multiple files may be determined in response to detecting the simultaneous addition of specific content to each of the multiple files. In another example, a user may frequently play a series of music files in a specific order. As such, the implicit position of each music file in the play order may be identified based on a temporal evaluation of the user's pattern of access/use. In yet another example, an implicit relationship may be recognized between two files that are accessed almost always at the same time.

Upon identifying one or more inferences from the user operations, a semantic attribute may be created based on the inferences in step 925 and associated with one or more files involved in the user operations. The semantic attribute may be stored in a properties section of the one or more files, or, alternatively, may be stored in a separate database that stores semantic attributes along with corresponding file associations.

Figure 10:
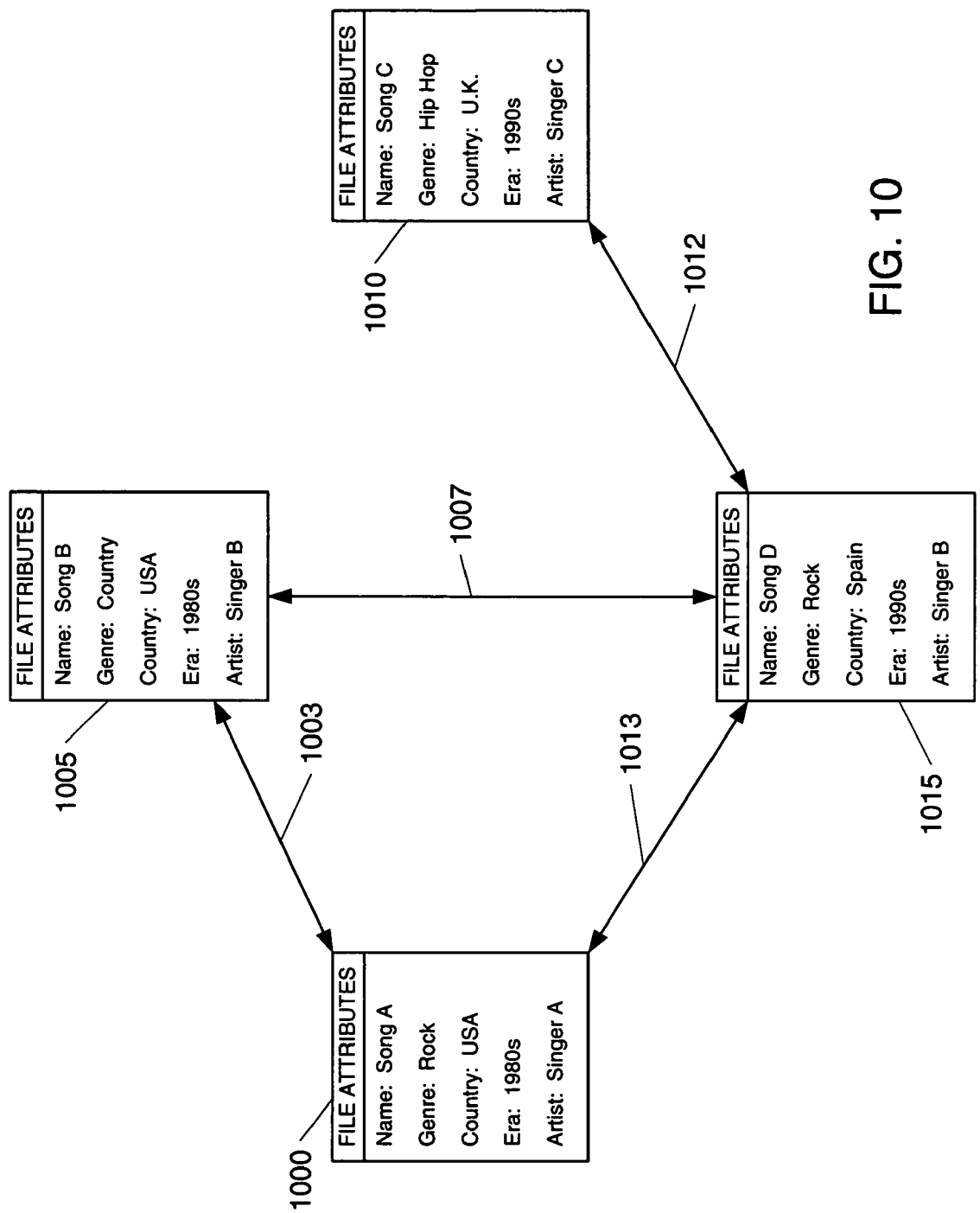
FIG. 10 is a block diagram illustrating semantic links created based on similar or identical file attributes according to one or more aspects described herein.

FIG. 10 is a block diagram illustrating a semantic file network built based on semantic links 1003, 1007, 1012 and 1013 between files 1000, 1005, 1010 and 1015. Files 1000, 1005, 1010 and 1015 include similar sets of attributes but with varying values associated with those attributes. For example, each of files 1000, 1005, 1010 and 1015 include a genre attribute, however, the genres of files 1000, 1005 and 1010 are different. Similarly, although each file 1000, 1005, 1010 and 1015 includes a country of origin attribute, the actual value associated with the attribute differs for each of files 1005, 1010 and 1015. As such, by comparing the attributes and associated values of each of files 1000, 1005, 1010 and 1015, a file network may be created by building links 1003, 1007, 1012 and 1013 between files having common attributes and attribute values. For example, link 1003 signifies a relationship between files 1000 and 1005 based on identical countries of origin. Link 1007 conveys a relationship between files 1005 and 1015 based on a common singer, Singer B. Links 1012 and 1013 define similar relationships based on common eras and genres, respectively of the associated files 1000, 10015 and 1010.

Files 1000, 1005, 1010 and 1015 may be linked to multiple other files, a single other file or even no files depending on their attributes and semantic relationships. For instance, file 1010 is semantically linked to only one file, file 1015 while file 1015 is semantically linked to all three other files 1000, 10015 and 1010. Alternatively or additionally, semantic links 1003, 1007, 1012 and 1013 may also be established between one or more files based on having a common attribute, even if the common attribute of each file does not share the same value. In one example, files 1000 and 1005 may include an additional attribute named "Dedication" that identifies a person, place or thing to which the songs of files 1000 and 1005 are dedicated. Files 1010 and 1015, on the other hand, might not have this attribute for a variety of reasons including if the songs associated with files 1010 and 1015 are not dedicated. A semantic link may thus be established between files 1000 and 1005 signifying a relationship between files 1000 and 1005 based on the common dedication attribute.

In one or more configurations, semantic links 1003, 1007, 1012 and 1013 may be created based on a user operation or a sequence of operations irrespective of whether files 1000, 1005, 1010 and 1015 share common attributes. For example, files that are contemporaneously accessed or used by similar user operations may be semantically linked. Similarly, if content of file 1010 is copied into file 1015, a semantic relationship and link between file 1010 and file 1015 may be inferred based on the sequence of copy and paste user operations. Semantic links 1003, 1007, 1012 and 1013 may further be constructed based on a combination of factors including user operations, context information and attributes of the files. Once created, semantic links 1003, 1007, 1012 and 1013 may be stored in files 1000, 1005, 1010 and 1015 or in a separate table or database that also stores an association with the relevant files.

Figure 11:
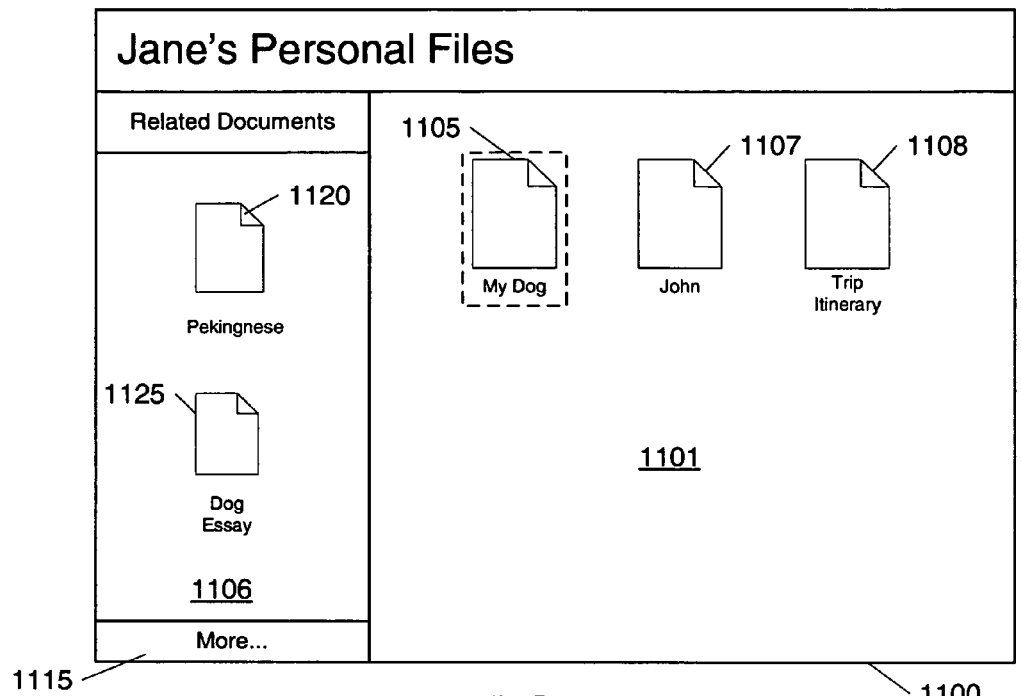
FIG. 11 is a user interface displaying an explorer window associated with a folder having multiple files and a window pane providing related documents according to one or more aspects described herein.

FIG. 11 is a user interface displaying a file browser window corresponding to folder 1100. Folder 1100 is divided into two sub-windows, navigation pane 1101 and related documents pane 1106. Navigation pane 1101 displays the contents of folder 100, which include files 1105, 1107 and 1108. Related documents pane 1106, on the other hand, displays representations of or links to files 1120 and 1125 and/or other types of data that are semantically linked to files 1105, 1107 and 1108 or to only selected file 1105. Related documents pane 1106 further includes an option 1115 to retrieve additional related documents or data. Related documents pane 1106 may be populated at various points in time including when one of files 1105, 1007 and 1108 is selected or accessed by the user. Alternatively, related documents pane 1106 may be populated upon opening folder 1100.

Related documents pane 1106, in FIG. 11, is populated in response to a user selection of file 1105 in navigation pane 1101. In particular, related documents pane 1106 is populated by files 1120 and 1125 in accordance with a user selection of file 1105. Files 1120 and 1125 are retrieved and displayed in pane 1106 based on semantic links that have been established between file 1105 and files 1120 and 1125 and/or based on the results of a semantic query. Semantic queries are discussed in further detail below. In one example, semantic links exist between file 1105 and files 1120 and 1125 because the files 1105, 1120 and 1125 are all related to dogs. As such, upon selecting file 1105 in navigation pane 1101, the file system automatically determines and retrieves files 1120 and 1125 that are semantically linked based on a dog attribute. In particular, file 1120 is associated with a photo of a Pekingnese dog while file 1125 pertains to an essay about dogs. Additional files (not shown) may also be retrieved that are semantically related or linked based on one or more user operations that define implicit relationships between files. While FIG. 11 displays related documents in association with a browser window like window 1100, related and linked documents may also be provided to the user when the user is using other various applications. For example, related documents may be retrieved when a user is editing a word processing document. In another scenario, one or more linked or related files may be identified and presented to the user while a user is viewing a series of photographs using an image editing application.

Additionally, More option 1115 allows a user to view or retrieve additional files that are linked or otherwise related to selected file 1105. For example, selecting more option 1115 may open a separate related documents window or dialog (not shown) that displays the entire list of identified related files. In one or more configurations, upon selecting one of the other files 1107 and 1108, the related documents pane 1106 may automatically be modified and updated in accordance with the attributes and links of the newly selected file, i.e., either file 1107 or 1108. The detection of numerous other user operations may also trigger the update of related documents window 1106. For example, window 1106 may be updated in response to a user hovering over file 1107 or 1108.

Figure 12:
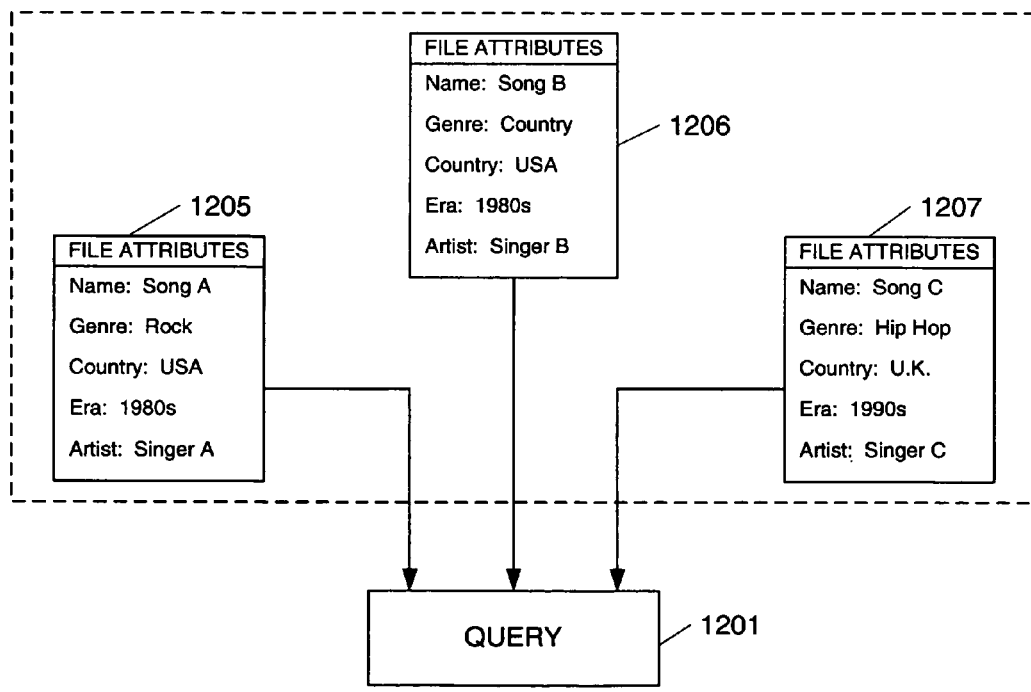
FIG. 12 is a block diagram of building a query based on a collection of files and their attributes according to one or more aspects described herein.

FIG. 12 is a block diagram illustrating the formation of a query for retrieving data from a semantic file network. Queries such as query 1201 in a semantic file network may be based on traditional keyword and file type information in addition to semantic attributes and relationships. The use of semantic attributes and relationships allows a user to construct a query based on a selected file or group of files 1205, 1206 and 1207. A user is thus relieved of having to manually generate and enter keywords or define numerous parameters for the query. Instead, queries may be developed or constructed by collecting and using the attributes of the single file or the group of files 1205, 1206 and 1207 to identify related files in the semantic network. Files 1205, 1206 and 1207 include several file attributes that may be extracted or generated in accordance with the methods and systems described herein. Upon selecting the group of files 1205, 1206 and 1207 as the query parameters, the file network system may analyze each file 1205, 1206 and 1207 to determine relevant attributes for inclusion in query 1201. In one instance, all of the attributes of files 1205, 1206 and 1207 may be included. Thus, query 1201 may include parameters identifying three different artists, two different eras and three different music genres. In another scenario, the query system may only select and use file attributes or values thereof that are common to a majority of files 1205, 1206 and 1207. For example, an era attribute corresponding to the 1980s common to files 1205 and 1206 may be included in the query while the 1990s era attribute of file 1207 might not.

Figure 13:
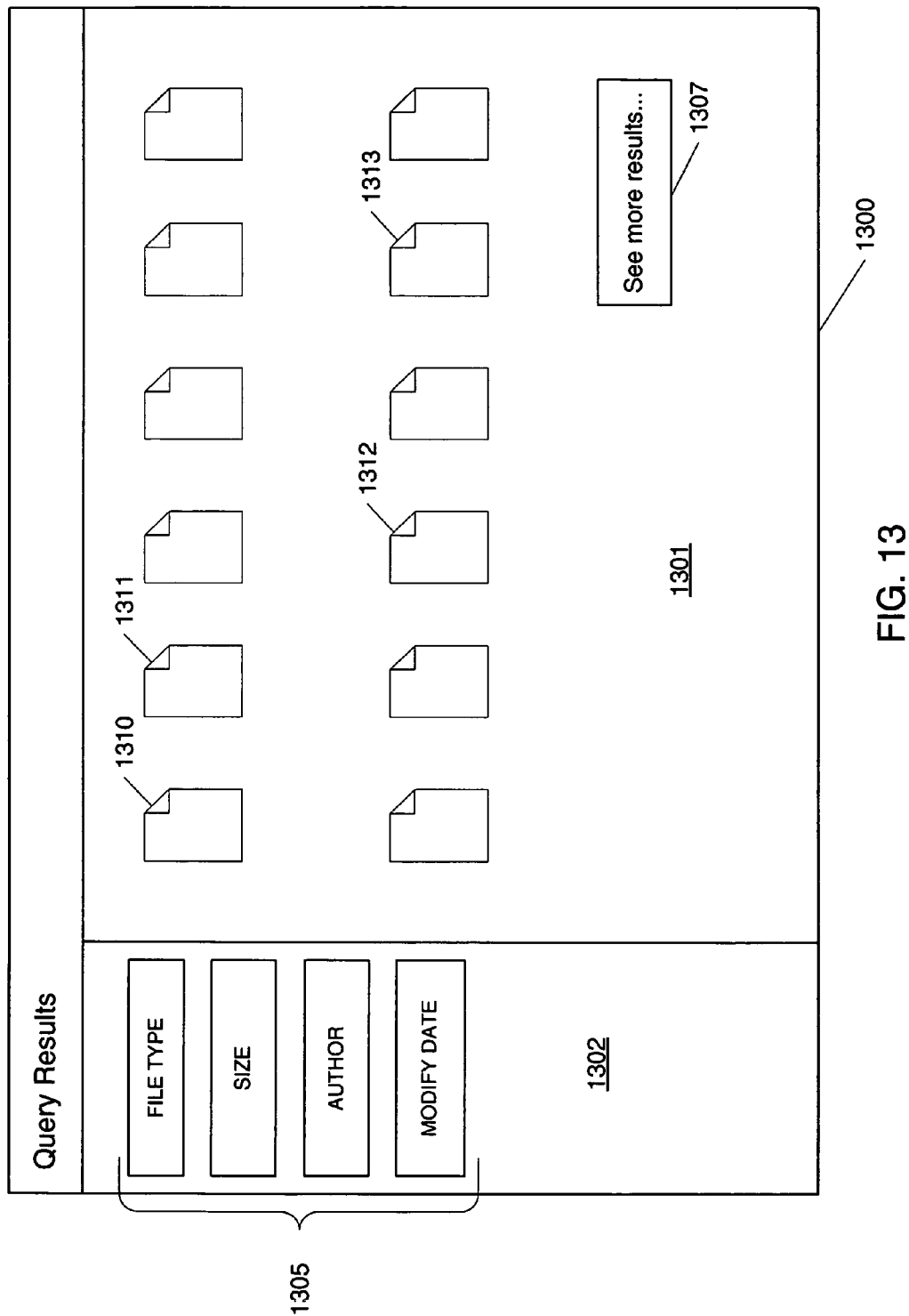
FIG. 13 is a user interface showing the results of a query in a dynamic folder according to one or more aspects described herein.

FIG. 13 is a user interface displaying the results of a query including files 1310, 1311, 1312 and 1313, such as the one formed in FIG. 12, in dynamic folder 1300. Unlike typical folders, a dynamic or virtual folder, as used herein, is created and defined based on one or more attributes that are not related or dictated by the underlying file system architecture. Dynamic folder 1300 is created in response to receiving a set of results from the network system based on the query. Folder 1300 stores the results as well as the original query and corresponding query parameters. As with other folders, once created, dynamic folder 1300 may be used to limit the scope of a particular search or query. For example, a user may limit a query to the results displayed in folder 1300. Dynamic folder 1300 includes two window panes, results pane 1301 and attribute pane 1302. Files 1310, 1311, 1312 and 1313 identified from the query are displayed in pane 1301 while various attribute options 1305 are displayed in pane 1302. Attribute options 1305 may include various file properties including file type, file size, author and the last modification date of the file.

Dynamic folder 1300 may further display the results of the query using an adaptive grouping technique. Adaptive grouping organizes the results into groups that have associated attributes or some other semantic relationship. Additionally, adaptive grouping includes two modes, namely implicit grouping and explicit adaptive grouping. Using explicit grouping, files are grouped according to a selected attribute option 1305. For example, if a user selects the file type option from pane 1302, the results of the query such as files 1310 and 1311 are grouped according to common file types in response. Similarly, if a user selects size, the results may be grouped based on their respective sizes. Multiple attributes or properties may be selected simultaneously to generate groups of results that contain multiple similar attributes. Additionally or alternatively, one selected attribute may be given more weight than a second selected attribute.

Implicit grouping, on the other hand, seeks to group results according to user preferences, access patterns and semantic attributes and relationships. That is, the file network automatically determines a grouping scheme based on semantic information and relationships associated with each of the files in the result set as well as in accordance with user preferences and access behavior. As such, attributes of the files as well as user operation patterns may be analyzed in determining appropriate grouping. For example, two result files such as files 1310 and 1311 may be frequently accessed or opened concurrently. Thus, based on this user operation pattern, files 1310 and 1311 may be grouped together using implicit adaptive grouping. In another example, files that are semantically linked may be automatically grouped together. In yet another example, a user may prefer to group files based on file types over based on semantic relationships. This preference may be explicitly set by the user or it may be implicitly learned based on the user's manual grouping behaviors. User preferences, user operations and operation patterns may further be stored in a user profile. The user profile may then be retrieved and analyzed to determine a preferred grouping arrangement when sorting a set of query results. Further, various semantic attributes or user operation patterns may be given more weight to provide a user with desirable groupings. These weights may also be based on user preferences which may be discerned from the user profile. As such, concurrent access of files 1310 and 1311 may be given more weight than a similar semantic attribute shared by files 1310 and 1312. The weighing may be determined based on user behavior and preferences and/or default system settings. User behavior and preferences may further be learned over time and based on previous groupings manually set by the user. In the event that too many results are identified based on a given query, the results displayed in results pane 1301 may be abbreviated. In addition, additional results 1307 option may be included in folder 1300 to allow a user to see the rest of the results.

Figure 14:
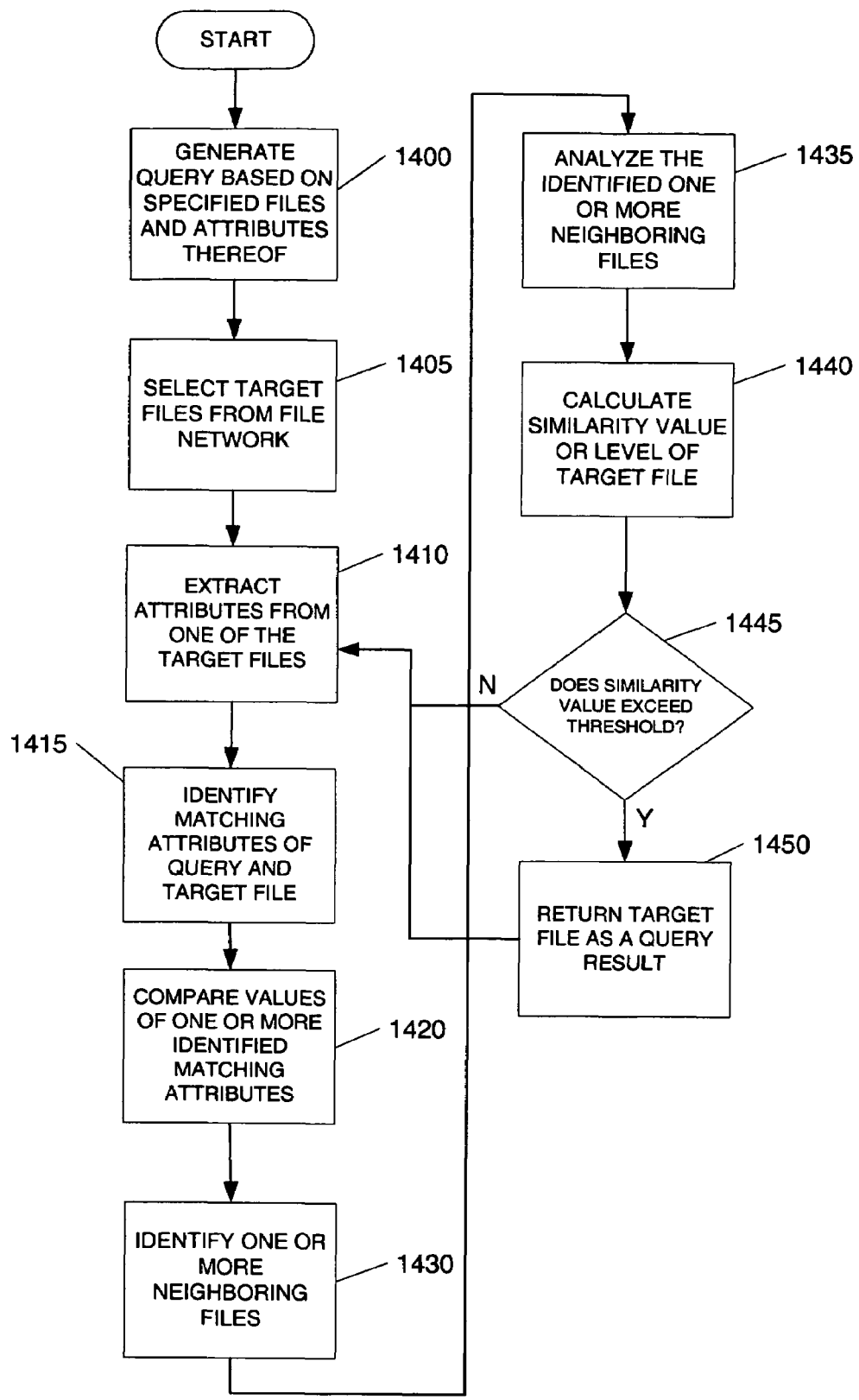
FIG. 14 is a flowchart showing a method for running a query and determining relevance and similarity between a query and target files according to one or more aspects described herein.

FIG. 14 is a flowchart illustrating a method for running a query in a semantic file network and determining a level of relevance and similarity between a target file and a query. In step 1400, a query is generated based on attributes of one or more files associated with the query. In particular, attributes of each of the one or more files may be extracted and stored in the query. The attributes stored in the query may also be manually specified by the user. In step 1405, a set of target files is selected from the semantic file network for analysis in response to the query. The set of target files may include all of the files within the semantic file network or, alternatively, may include a subset selected based on a variety of factors. For example, the target files may be selected based on a storage location specified by the user. Once the target files have been selected and identified, attributes are extracted from each of the target files in step 1410. The extracted attributes are then compared to the one or more properties and/or attributes of the query. In particular, the attributes of the target file and the attributes of the query are compared to determine whether there are any matching attributes in step 1415. If so, the values of the matching attributes are then compared to determine whether the values are the same or similar in step 1420.

After evaluating the target file, itself, one or more neighboring or associated files may be identified in step 1430. The neighboring or associated files are analyzed in step 1435 in a similar manner as with the target file. That is, processes similar to those of steps 1415 and 1420 are performed for each neighboring or associated file to determine similarity of each of the neighboring files with the query. Once each of the neighboring and/or associated files have been appropriately evaluated, an overall similarity value for the target file is generated in step 1440 based on the amount of mutual information between the target file and the query as well as between the query and each of the neighboring files. In one or more configurations, the similarity value may be calculated according to the following equation:

$$S(q, f) = a * I(q, f) + (1 - a) * \sum_{<e,f> \in E} S(q, e)$$

The function S represents a similarity value while the function I corresponds to mutual information between two variables. The variable q represents the query and the variable f represents a target file while variable e corresponds to f's neighbors and a constitutes an adjustable weight. The equation determines a similarly value between a query q and a target file f based on mutual information I of query q and file f in addition to a summation of the similarities between query q and neighboring files e. The weight a may be modified to give more weight to mutual information between the query and the target file and less weight to the similarity value between the query and the target file's neighbors or associated files or vice versa. Variable E represents a linkage of files associated with target file f. Thus, according to the above equation, the summation of similarities includes all neighbor files with which file f is linked.

Once the similarity value has been determined in step 1440, the similarity value or level is compared to a threshold similarity or relevance in step 1445. If the similarity level meets or exceeds the threshold, then the target file may be returned in the query results in step 1450. If the similarity level is below the threshold, however, the target file might not be returned. The threshold may be predefined based on a user preference or a system default. Alternatively or additionally, the threshold may be automatically determined based on a minimum number of results to return. Thus, the threshold may be adjusted downward if an insufficient number of results are produced with the original threshold.

Figure 15:
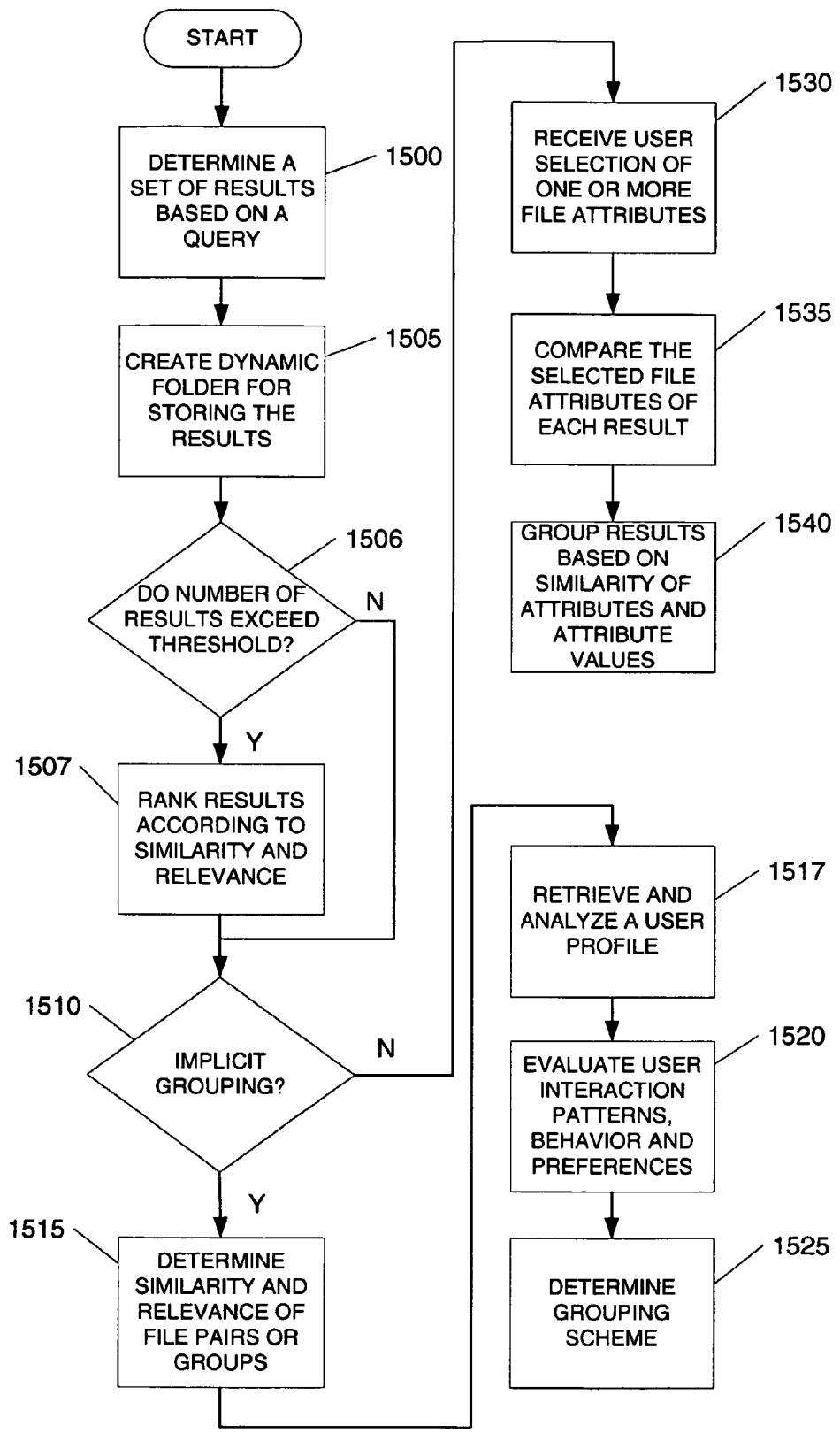
FIG. 15 is a flowchart showing a method for adaptively grouping results of a query according to one or more aspects described herein.

FIG. 15 is a flowchart illustrating a method for presenting the results of a query using adaptive grouping and ranking. In step 1500, a set of results are determined based on the query. In response, a dynamic folder is created in step 1505 that stores the set of results, the query and any other information associated with the query. In one or more configurations, the folder may store links to the results rather than the results themselves. Various other storing techniques may also be implemented. In step 1506, a determination is made regarding whether the number of results exceeds a particular threshold. If so, in step 1507, the results may be ranked according to a level of similarity and relevance determined from the search. A predetermined number of results are shown to the user according to the ranking and the rest may be hidden and displayed upon request.

Additionally, user feedback such as the selection of a ranked result item may be recorded to enhance future queries and result ranking. In particular, according to the above equation, the ranking function may consider the similarity S between q and f. After user select f, then the metadata of q could be saved in the metadata of f. Therefore, when the next query q is submitted, f may receive a high similarity value and consequently a high rank. In one example, a user may enter a query about dogs with short hair. In response, a system may respond with a list of ranked results including a picture of a pug. If the user selects or accesses the picture, the semantic attributes associated with the original query may be added to the picture's attribute information. Accordingly, if the user were to repeat the query about dogs in the future, the pug picture file may be ranked higher than the rank it had in the first result list.

In step 1510, a determination is made as to whether the results should be grouped using implicit adaptive grouping or explicit adaptive grouping. The determination may be based on a user selection and/or a system default. If the results are to be implicitly grouped, attributes of each of the results may be evaluated to determine a similarity or relevance of the results in step 1515. A user profile containing user preferences and stored user operations is further retrieved in step 1517. Based on the user profile, the user preferences, user access and interaction patterns are then evaluated in step 1520 to determine semantic relationships between the results. User access and interaction patterns as well as user preferences may be stored in a user profile. When determining a grouping scheme for the results, a user's profile may be retrieved to provide additional considerations in how the results should be grouped. For example, a user may prefer to group files that they frequently open concurrently. This user preference may be stored in a user profile. Upon receiving a set of query results, the grouping of the results would factor in the user's preference to have files that are concurrently accessed grouped together. As such, based on the analysis of file attributes and user access patterns as well as user preferences, a grouping scheme is determined in step 1525 for the dynamic folder.

If, however, in step 1510, it is determined that the results should be grouped using explicit adaptive grouping, a selection of a file attribute may be received from the user in step 1530. File attributes that a user may select may include file size, file type, author and modification date. Other file attributes may also be included in a menu of file attributes. In step 1535, compares the selected file attribute of each of the files with the selected file attribute of each of the other files. If the values of the selected file attributes of two files match, the two files may be grouped together in step 1540. For example, if the authors of a first file and a second file match, the first file and the second file may be grouped together in a dynamic results folder. Once a grouping scheme or plan has been generated, a user may select one of the groups of files and a new dynamic folder may be generated that contains and displays only the selected group of files. Implicit and explicit grouping may also be used in combination to generate appropriate groups of results. The grouping of results allows a user to more efficiently review the results and determine which files are most relevant.

Figure 16:
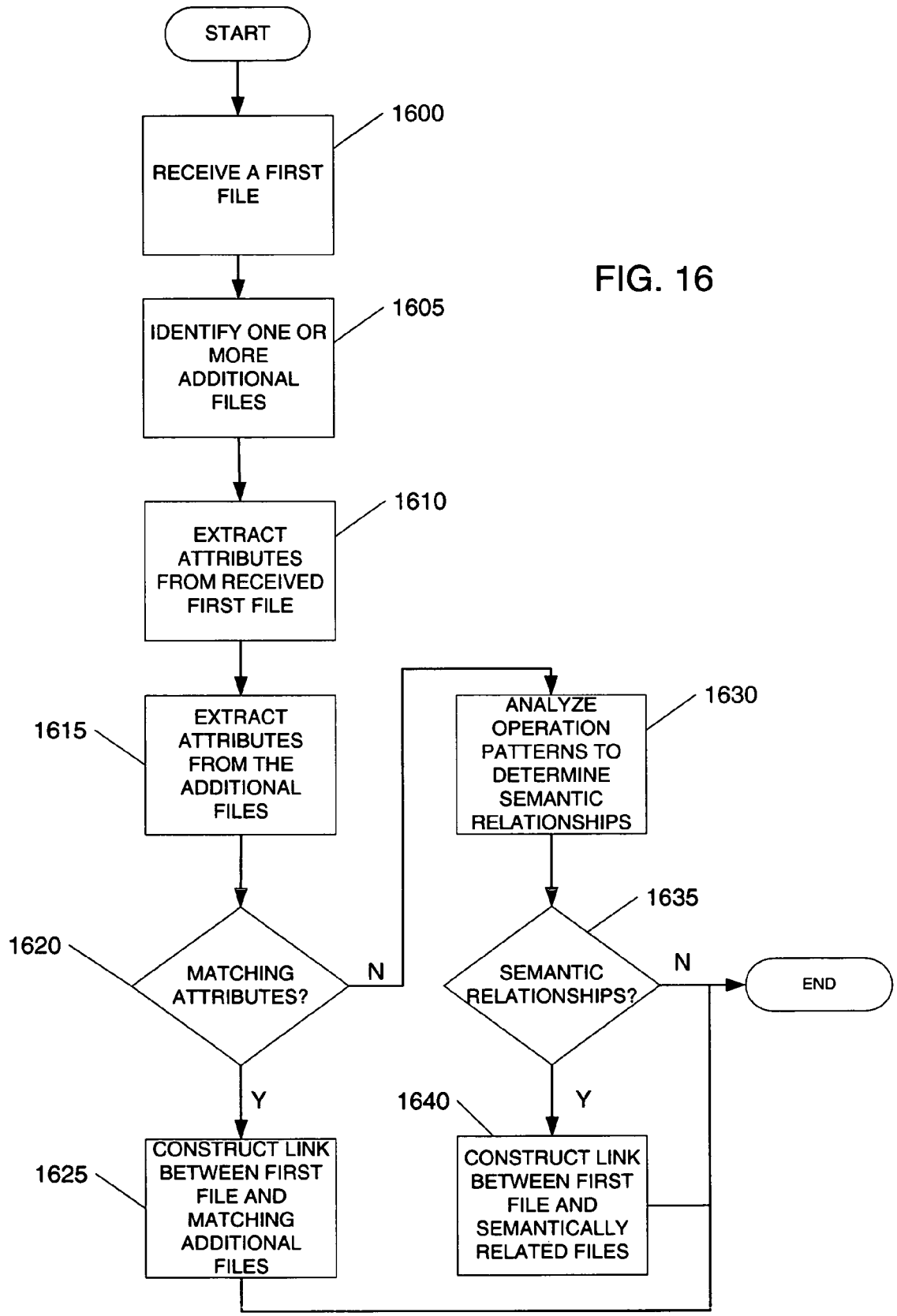
FIG. 16 is a flowchart showing a method for building a semantic file network according to one or more aspects described herein

FIG. 16 is a flowchart illustrating a method for building a semantic file network and in particular, establishing semantic links between two files. In step 1600, a first file is received and/or identified by the network system. The file may be new to the network or may have just been updated. In step 1605, one or more additional files that may be relevant to the first file are identified. The one or more additional files may be identified by determining files that have similar file types or other attribute information. Once the one or more additional files have been identified the semantic network may extract one or more attributes from the first file in step 1610. In step 1615, one or more attributes may be extracted from the one or more additional files identified in step 1605. The attributes and the values corresponding thereto are then compared in step 1620 to determine whether there are matching attributes and/or values between the first file and the one or more additional files. If there are matching attributes and/or values, a semantic link may be constructed between the first file and the one or more additional files that have a matching attribute and/or value in step 1625. In one or more configurations, semantic links may be created upon detecting matching attributes, but not attribute values. Alternatively or additionally, semantic links may also be created upon finding two files with matching attributes values, but not attribute names. The latter case seeks to capture files which are related to the same attribute values, but which store the values under different attribute names. If a match is not found, the semantic file network may further analyze user operation patterns in step 1630 to determine whether a semantic relationship exists between the first file and any of the one or more additional files in step 1635. If so, one or more semantic links may be constructed from the first file to the one or more additional files with which the first file has a semantic relationship in step 1640. User operations may be evaluated independently of the attribute analysis. As such, user operations may be considered and evaluated regardless of whether files or data with matching attributes are found.

The methods and systems described herein have been discussed, in large part, with respect to data files and semantic attributes thereof. However, semantic attributes may be generated for a variety of data structures and the methods and systems described are not limited to just data files. For example, words of a text document may include various properties such as font size and font style. The words of a text document may further include semantic attributes extracted from surrounding context information. Similarly, a first portion of a photo may have different properties than a second portion of the photo. Accordingly, semantic attributes may be generated for the first portion of the photo based on an analysis of image content and attributes surrounding the first portion while separate semantic attributes may be generated for the second portion based on an analysis of the characteristics of the images surrounding the second portion.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer readable medium storing computer readable instructions that, when executed by a computer with an operating system, perform a method for extracting semantic information, the method comprising the steps of:

identifying one or more user operations associated with a plurality of files, the user operations including opening files so that the files are open simultaneously and copying information from a first file and pasting it into a second file;

determining implicit information associated with at least one file of the plurality of files based on the one or more user operations, the implicit information relating to relationships and attribute information that is derived based on sequences of the user operations;

determining automatically one or more semantic attributes of the at least one file based on the determined implicit information, the semantic attributes being properties and characteristics of a file that are not predefined by the operating system and indicating that files are open simultaneously or that information is copied from a the first file and pasted into the second file;

storing the one or more determined semantic attributes as meta data associated with the at least one file;

receiving from a user a selection of at least one file, the selected at least one file having associated semantic attributes;

constructing a query based on semantic attributes associated with the selected at least one file;

determining whether semantic attributes of any target files match the constructed query; and displaying to the user an indication of the target files whose semantic attributes match the constructed query as results of the query wherein the step of determining implicit information includes evaluating a relationship between a first user operation and a second user operation.

2. The computer readable medium of claim 1, further comprising the steps of:

receiving the one or more user operations associated with the plurality of files; and storing the one or more user operations, wherein storing the one or more user operations includes storing an association between the one or more user operations and at least one file of the plurality of files.

3. The computer readable medium of claim 1, wherein the step of determining one or more semantic attributes is further based on a spatial relationship between at least two files associated with the one or more user operations.

4. The computer readable medium of claim 1, wherein the one or more user operations include a modification to a content of the file.

5. The computer readable medium of claim 1, wherein the step of determining implicit information is further based on a sequence of the first and second user operations.

6. A computer with a processing unit, memory, and an application for searching for files based on semantic information extracted from files, comprising:
- a module that identifies user actions associated with the files, the user actions including opening files so that the files are open simultaneously and copying information from a first file and pasting it into a second file;
- a module that determines implicit information associated with at least one file based on the one more user actions, the implicit information relating to relationships and attribute information that is derived based on sequences of the user actions;
- a module that automatically generates semantic attributes of files based on the determined implicit information, the semantic attributes being properties of a file not defined by the application that manages the files and indicating that files are open simultaneously or that information is copied from the first file and pasted into the second file;
- a module that associates the generated semantic attributes as meta data of the files;
- a module that receives from a user a selection of at least one file, the selected at least one file having associated semantic attributes and that constructs a query based on semantic attributes associated with the selected at least one file;
- a module that determines whether any files match the query based on comparison of the semantic attributes associated with the files to the constructed query; and
- a module that displays to the user an indication of the matching files whose semantic attributes match the constructed query wherein the module that determines implicit information evaluates a relationship between a first user action and a second user action.

7. The computer of claim 6 wherein the application is an operating system.

8. The computer of claim 6 wherein the semantic attribute for the first file indicating a relationship with the second file is generated after the first file and the second file are opened simultaneously a threshold number of times.

9. The computer of claim 6 wherein the semantic attribute for the first file indicating a relationship with the second file is generated after the first file and the second file are opened simultaneously more than a threshold length of time.

10. A method in a computer with an operating system for associating semantic information with files based on interpretation of user actions associated with the files, the method comprising:
- identifying user actions associated with the files, the user actions including opening files so that the files are open simultaneously and copying information from a first file and pasting it into a second file;
- determining implicit information associated with at least one file based on the one or more user actions, the implicit information relating to relationships and attribute information that is derived based on sequences of the user actions;
- generating automatically semantic attributes based on the determined implicit information the semantic attributes relating to characteristics of a file that are not predefined by the operating system and indicating that files are open simultaneously or that information is copied from the first file and pasted into the second file;
- associating the generated semantic attributes with the files as meta data of the files; and
- providing an indication of files that match a query wherein a file matches the query based at least in part on comparison of the query to the generated semantic attributes that are associated with the file, the providing including;
  - receiving from a user a selection of files;
  - constructing a query based on semantic attributes associated with the selected files;
  - determining whether semantic attributes of any files match the constructed query; and
  - displaying to the user an indication of the files whose semantic attributes match the constructed query
- wherein determining of the implicit information includes evaluating a relationship between a first user action and a second user action.

11. The method of claim 10 wherein a semantic attribute for the first file indicating a relationship with the second file is generated after the first file and the second file are opened simultaneously a threshold number of times.

12. The method of claim 10 wherein a semantic attribute for the first file indicating a relationship with the second file is generated after the first and the second file are opened simultaneously more than a threshold length of time.

* * * * *